US012670383B2

(12) United States Patent
Rhodes et al.

(10) Patent No.: US 12,670,383 B2
(45) Date of Patent: Jun. 30, 2026

(54) SYSTEM AND METHOD OF USING FRACTIONAL ADAPTIVE LINEAR UNIT AS ACTIVATION IN ARTIFICIAL NEURAL NETWORKS

(71) Applicant: Intel Corporation, Santa Clara, CA (US)

(72) Inventors: Anthony Daniel Rhodes, Portland, OR (US); Julio Cesar Zamora Esquivel, West Sacramento, CA (US); Lama Nachman, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 17/548,692

(22) Filed: Dec. 13, 2021

(65) Prior Publication Data

US 2022/0101138 A1     Mar. 31, 2022

(51) Int. Cl.
G06N 3/08 (2023.01)
G06N 3/048 (2023.01)

(52) U.S. Cl.
CPC .............. G06N 3/08 (2013.01); G06N 3/048 (2023.01)

(58) Field of Classification Search
CPC .......... G06N 3/08; G06N 20/00; G06N 3/048; G06N 3/0481
See application file for complete search history.

(56) References Cited

U.S. PATENT DOCUMENTS

2019/0049294 A1     2/2019   Miki et al.
2020/0026570 A1*    1/2020   Gottin et al. ............ G06N 3/02
                                                              718/104

OTHER PUBLICATIONS

Klambauer et al. "Self-normalizing neural networks." 2017 Advances in neural information processing systems. (Year: 2017).*
Qiu et al. "FReLU: Flexible rectified linear units for improving convolutional neural networks." 2018 24th international conference on pattern recognition (icpr). IEEE (Year: 2018).*
1. Esquivel et al., "Adaptive Activation Functions Using Fractional Calculus," Mar. 5, 2020, IEEE/CVF International Conference on Computer Vision Workshop (ICCVW), Seoul, Korea (South), 2019, pp. 2006-2013, doi: 10.1109/ICCVW.2019.00250 (Year: 2020).*

(Continued)

*Primary Examiner* — Randall K. Baldwin
(74) *Attorney, Agent, or Firm* — Akona IP PC

(57) ABSTRACT

An apparatus is provided for deep learning. The apparatus accesses a neural network including an input layer, hidden layers, and an output layer. The apparatus adds an activation function to one or more of the hidden layers of the hidden layers and output layer. The activation function includes a tunable parameter, the value of which can be adjusted during the training of the neural network. The apparatus trains the neural network by inputting training samples into the neural network and determining internal parameters of the neural network based on the training samples. Determining the internal parameters includes determining a value of the tunable parameter based on the training samples. The apparatus may determine two different values of the tunable parameter for two different layers. The activation function may include another tunable parameter. The apparatus can determine a value for the other tunable parameter during the training of the neural network.

20 Claims, 8 Drawing Sheets

(56)                    References Cited

OTHER PUBLICATIONS

2. Esquivel et al., "Fractional Adaptation of Activation Functions In Neural Networks," May 5, 2020, 25th International Conference on Pattern Recognition (ICPR), Milan, Italy, 2021, pp. 7544-7550, doi: 10.1109/ICPR48806.2021.9413338. (Year: 2020).*

3. Ivanov, "Fractional Activation Functions in Feedforward Artificial Neural Networks," Aug. 26, 2018, 20th International Symposium on Electrical Apparatus and Technologies (SIELA), Bourgas, Bulgaria, 2018, pp. 1-4, doi: 10.1109/SIELA.2018.8447139. (Year: 2018).*

Datta, Gourav, et al. "HYPER-SNN: Towards energy-efficient quantized deep spiking neural networks for hyperspectral image classification." arXiv preprint arXiv:2107.11979 v2 (Jul. 2021). (Year: 2021).*

* cited by examiner

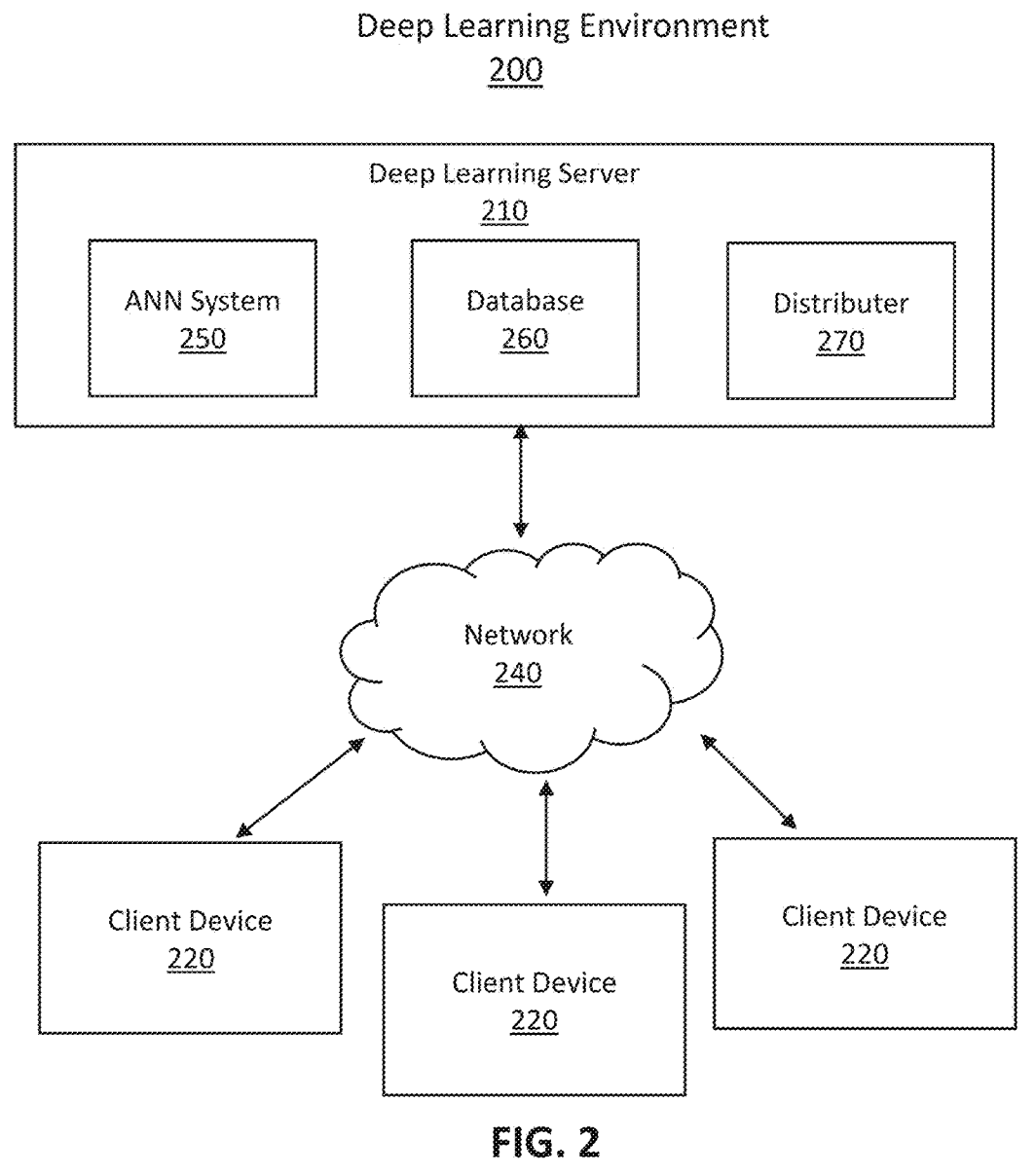

Deep Learning Environment
200

Deep Learning Server
210

ANN System
250

Database
260

Distributer
270

Network
240

Client Device
220

Client Device
220

Client Device
220

FIG. 2

ANN System
250

Interface Module
310

Training Module
320

Validation Module
330

Application Module
340

Memory
350

FIG. 4

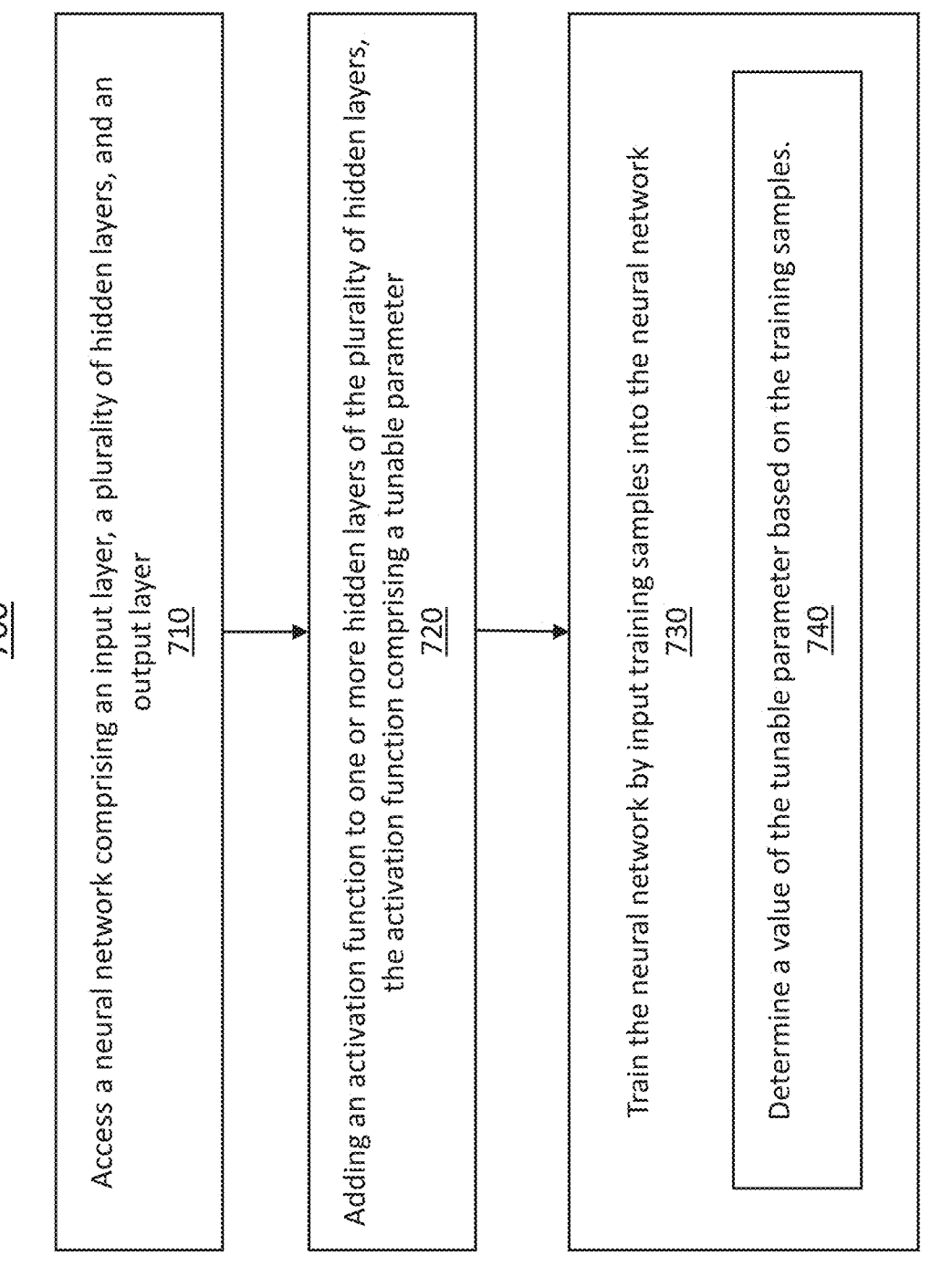

700

Access a neural network comprising an input layer, a plurality of hidden layers, and an output layer
710

Adding an activation function to one or more hidden layers of the plurality of hidden layers, the activation function comprising a tunable parameter
720

Train the neural network by input training samples into the neural network
730

Determine a value of the tunable parameter based on the training samples.
740

FIG. 7

SYSTEM AND METHOD OF USING FRACTIONAL ADAPTIVE LINEAR UNIT AS ACTIVATION IN ARTIFICIAL NEURAL NETWORKS

TECHNICAL FIELD

This disclosure relates generally to Artificial Neural Networks (ANNs), and more specifically, to activation functions of ANNs.

BACKGROUND

ANNs have been used extensively for a variety of artificial intelligence applications ranging from computer vision to speech recognition and natural language processing. ANNs typically include activation functions. An activation function in an ANN defines how the weighted sum of the input is transformed into an output from a node or nodes in a layer of the network. Activation functions play a vital role in the capability and performance of ANNs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 2 illustrates a deep learning (DL) environment, in accordance with various embodiments.

FIG. 4 illustrates example FALU (Fractional Adaptive Linear Unit) activation functions, in accordance with various embodiments.

FIG. 7 is a flowchart showing a method of DL based on a trainable activation function, in accordance with various embodiments.

DETAILED DESCRIPTION

Overview

Figure 1:
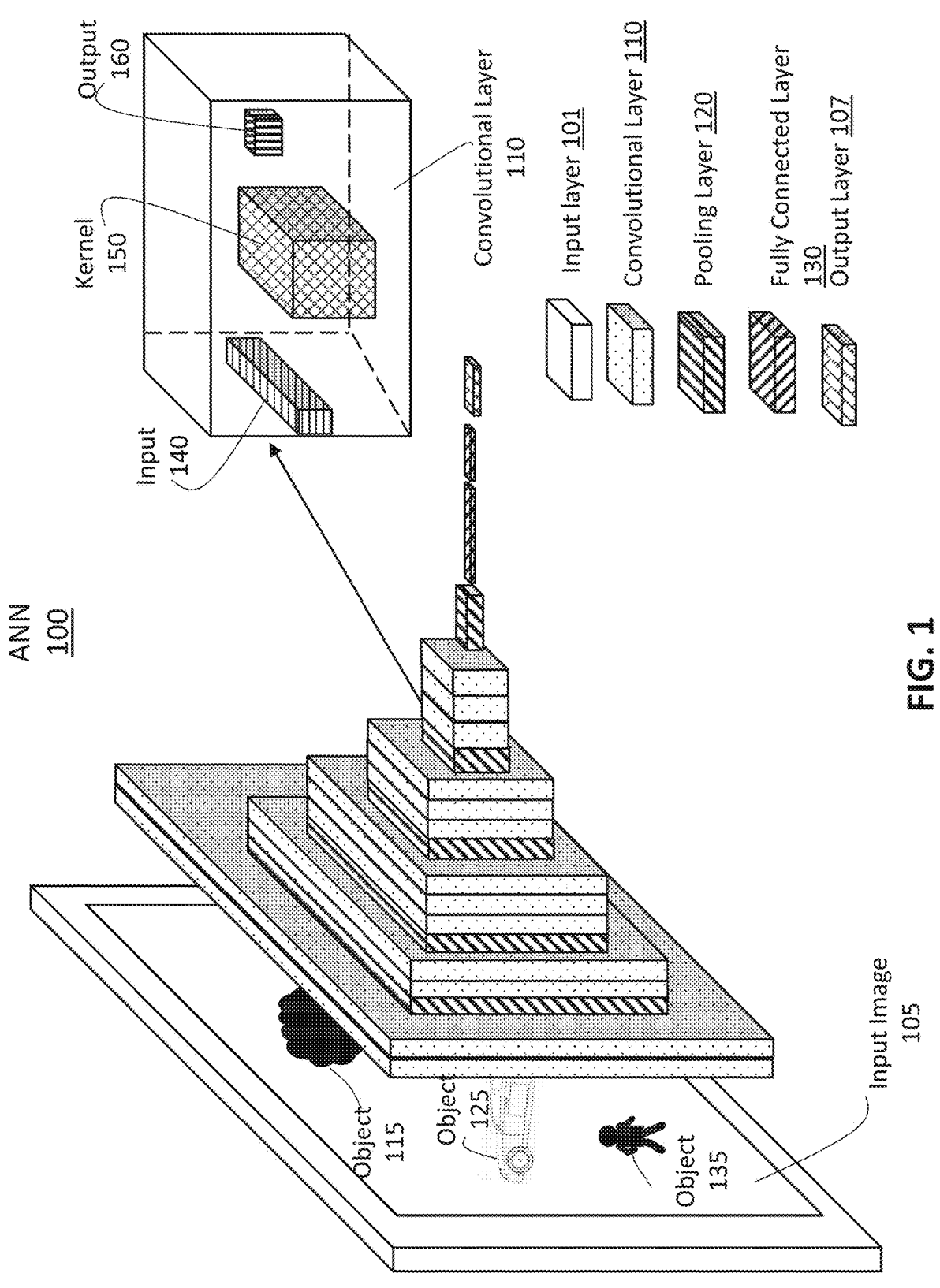
FIG. 1 illustrates an architecture of an example ANN, in accordance with various embodiments.

DL models are characterized by the ability to produce effective abstract representations of data using automatic latent feature extraction. The genesis of ANNs can be traced to the McCulloch-Pitts neural model, which provides a mathematical description of the high-level functionality of a single biological neuron. In the McCulloch-Pitts neural model, a neuron receives one or more inputs, and these inputs are then aggregated and passed through a non-linear activation function. An activation function defines how the weighted sum of the input are transformed into the output from a neuron in a layer of the ANN. The activation function serves to approximate the "firing" mechanism of the neuron. In this way, if the action potential of the neuron is sufficiently large, the activation function induces a firing state for the neuron.

However, since the introduction of the McCulloch-Pitts model, very little has structurally changed. The bulk of ANN research in subsequent years focused on the development of engineering and architectural improvements of ANNs to enhance the efficiency of feature processing and feature learning. These innovations included the introduction of residual connections, feature normalization, novel regularization methods, and multi-scale feature aggregation, among others. However, these historical design enhancements have ignored explicit modifications made to activation functions. This inattention is possibly due to the generalization of large families of activation functions as conduits to universal approximation, which gives a misguided impression of their relative insignificance.

The Sigmoid activation function is one of the well-known activation functions. The Sigmoid activation function is defined by the following formula:

$$\sigma(x) = \frac{1}{1 + e^{-x}}$$

where x is the input to the activation function and a is the output. Sigmoid activation function was used widely in ANN design for a long time. However, the Sigmoid activation function has inherent limitations, e.g., the vanishing gradient phenomenon. The inherent limitations of the Sigmoid activation function are becoming more significant as researchers pushed to increase the capacity of ANNs by introducing deeper architectures.

More recently, other activation functions were introduced. One example is ReLU activation, which is usually used as the default activation function for ANNs. ReLU has different versions. A smoothed version of the ReLU activation is defined as:

$$f(x) = \log(1 + e^x)$$

where e is the Euler's number, x is the input to the activation function and $f$ is the output. The ReLU activation is preferred by practitioners due to its computational simplicity, favorable non-saturation properties, and the perception of its robustness including undesirable behavior including vanishing gradient. However, ReLU also suffers from the vanishing gradient phenomenon. ReLU neurons may become inactive and outputs 0 for any input.

Another example is the Gaussian Error Linear Unit (GELU) activation function:

$$f(x) = x\Phi(x)$$

where $\Phi(x)$ denotes the Gaussian cumulative distribution function. GELU functions exemplify a smoothed ReLU shape with an asymptotically-bounded negative region. Swish activation function is another widely used activation function. The Swish activation is defined as:

$$f(x) = x\sigma(x)$$

Swish activation outperforms ReLU activation across a variety of models and problem types. However, none of these activation functions provides the flexibility to preserves the strengths of other types of activation functions while providing enhanced expressiveness and performance.

The present invention provides an adaptive (i.e., trainable) activation function termed FALU activation. The FALU activation includes tunable parameters. A tunable parameter is a trainable parameter whose value is determined during the training of the ANN. An example of the FALU activation is defined as:

$$f(x)=D^{\alpha}x\sigma(\beta x)$$

where $\alpha$ is a fractional derivative order, $\beta$, a scaling parameter, and D is the differentiation operator. The factional derivative is tunable, meaning its value can be determined during the training of the ANN, as opposed to being a constant.

As each tunable parameter can have different values, the FALU activation can be used to generate a family of activation functions that includes, for example, Sigmoid activation, ReLU activation, GELU activation, Swish activation, Gaussian activation, fine-tuned interpolations between these functions, and other activation functions. Therefore, the FALU provides a dynamic generalization of the state-of-the-art activation functions and preserves their strengths. Moreover, the FALU activation can provide enhanced performance to the ANN. For instance, the FALU activation can be used as the activation function of multiple hidden layers (or even all the hidden layers and the output layer) in an ANN. As the tunable parameters are trainable, as opposed to being constant numbers, the values of the tunable parameters for different layers can be different. In other words, different activation functions can be generated for all these hidden layers by using the FALU activation. As the values of the tunable parameters are determined by training, the activation functions generated from the FALU activation can provide better ANN capability and performance, compared with activation functions with fixed parameters.

In some embodiments, the domain of the value of a tunable parameter in the FALU activation can be restricted to reduce computational resources required to train the FALU activation. For instance, a computationally efficient approximation of the FALU activation can be used to reduce resources required by applying the FALU activation. For instance, the domain of the fractional derivative order is restricted to [0,2], i.e., a range from 0 to 2 including 0 and 2, and the domain of the scaling parameter is restricted to [1, 10], i.e., a range from 1 to 10 including 1 and 10. In an embodiment, the domain of the fractional derivative order can further be divided into two sub-domains: [0,1], i.e., a range from 0 to 1 including 0 and 1, and (1,2), i.e., a range from 1 to 2 excluding 1 but including 2. An approximation of the FALU activation can be generated based on the sub-domains. The approximation requires even less computational resources.

$$f(x) = D^{\alpha}x\sigma(\beta x) \approx \begin{cases} g(x, \beta) + \alpha\sigma(\beta x)(1 - g(x, \beta)), \ \alpha \in [0, 1] \\ h(x, \beta) + \alpha\sigma(\beta x)(1 - 2h(x, \beta)), \ \alpha \in (1, 2] \end{cases}$$

where $h(x, \beta)=g(x, \beta)+\sigma(\beta x)(1-g(x, \beta))$.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well-known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example ANN Architecture

FIG. 1 illustrates an architecture of an example ANN 100, in accordance with various embodiments. For purpose of illustration, the ANN 100 in FIG. 1 is a Visual Geometry Group (VGG)-based convolutional neural network (CNN). In other embodiments, the ANN 100 may be other types of neural network. In the embodiment of FIG. 1, the ANN 100 is trained to receive images and output classifications of objects in the images. The ANN 100 includes an input layer 101, hidden layers, and an output layer 107. In other embodiments, the ANN 100 may include fewer, more, or different layers.

The input layer 101 receives an input image 105 that includes objects 115, 125, and 135. The output layer 107 provides the output of the ANN 100 that are generated by the hidden layers based on the input image 105. In the embodiment of FIG. 1, the output layer 107 includes classifications of the objects 115, 125, and 135 in the input image 105. The hidden layers are between the input layer 101 and output layer 107. The hidden layers include a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130").

The convolutional layers 110 summarize the presence of features in the input image 105. The convolutional layers 110 function as feature extractors. The first layer of the ANN 100 is a convolutional layer 110. In an example, a convolutional layer 110 performs a convolution to an input 140 by using a kernel 150, generates an output 160 from the convolution, and passes the output 160 to the next layer in the sequence. For the first convolutional layer 110, which is also the first layer of the ANN 100, the input 140 is the input image 105. For the other convolutional layers, the input 140 may be an output of another convolutional layer 110 or an output of a pooling layer 120. The kernel 150 includes a set of filters. The convolution is a linear operation that involves the multiplication of the filters with the input 140. A filter may be a 2-dimensional array of weights. Weights of the filters can be initialized and updated by backpropagation using gradient descent. The magnitudes of the weights of the filters can indicate importance of the filters in extracting features from the input 140. The filter is smaller than the input 140.

The multiplication applied between a filter-sized patch of the input 140 and the filter may be a dot product. A dot product is the element-wise multiplication between the filter-sized patch of the input 140 and the corresponding filter, which is then summed, always resulting in a single value. Because it results in a single value, the operation is often referred to as the "scalar product." Using a filter smaller than the input 140 is intentional as it allows the same filter (set of weights) to be multiplied by the input 140 multiple times at different points on the input 140. Specifically, the filter is applied systematically to each overlapping part or filter-sized patch of the input 140, left to right, top to bottom. The result from multiplying the filter with the input 140 one time is a single value. As the filter is applied multiple times to the input 140, the output 160 is a two-dimensional array of output values that represent a filtering of the input 140. As such, the 2-dimensional output array from this operation is referred to a "feature map."

In some embodiments, after a feature map (i.e., the output 160) is created, each value in the feature map can be passed through an activation function. In various embodiments, the activation function is a FALU. The FALU is a dynamic generalization of the Swish activation ($f(x)=x\sigma(\beta x)$) by introducing two tunable parameters: $\alpha$ (a fractional derivative order) and $\beta$ (a scaling parameter):

$$f(x)=D^{\alpha}x\sigma(\beta x)$$

where x is the input to the activation function, $f(x)$ is the output of the activation function, and $D^{\alpha}$ is a linear operator for every real number $\alpha$. $\alpha$ may be an integer or non-integer. In some embodiments, the domain of the fractional derivative order is restricted to $\alpha \in [0,2]$ and the domain of the scaling parameter is restricted to $\beta \in [1,10]$. The FALU can generate known activation functions. For example, when $\alpha=0$ and $\beta=1$, the FALU yields the standard Swish function ($f(x)=x\sigma(\beta x)$). As another example, when $\alpha=0$ and $\beta=1.702$, the FALU reduces to the approximated GELU activation.

In some embodiments, the FALU is further defined based on the standard Gamma function $\Gamma(n)=(n-1)!$:

$$f(x) = D^{\alpha}x\sigma(\beta x) = \lim_{\delta \to 0}\frac{1}{\delta^{\alpha}}\sum_{n=0}^{\infty}(-1)^{n}\frac{\Gamma(\alpha+1)g(x-\delta n, \beta)}{\Gamma(n+1)\Gamma(1-n+\alpha)}$$

where $\delta$ is the approximation step size, n can be any positive integer, and $g(x, \beta)$ is the Swish activation function, $x\sigma(\beta x)$.

In other embodiments, the FALU is a computationally efficient approximation of the formulation above. The computationally efficient approximation is defined as:

$$f(x) = D^{\alpha}x\sigma(\beta x) \approx \begin{cases} g(x, \beta)+\alpha\sigma(\beta x)(1-g(x, \beta)), & \alpha \in [0, 1] \\ h(x, \beta)+\alpha\sigma(\beta x)(1-2h(x, \beta)), & \alpha \in (1, 2] \end{cases}$$

where $h(x, \beta)=g(x, \beta)+\sigma(\beta x)(1-g(x, \beta))$. The computationally efficient approximation can be executed with back-propagation efficiently using only a few lines of code in standard automatic differentiation workflows.

The fractional derivative order $\alpha$ and scaling parameter $\beta$ are tunable, meaning their values are not fixed. Rather, their values are determined during the training process of the ANN 100. The values of the tunable parameters for different convolutional layers 110 can be different. In an embodiment, the FALU is used in all the convolutional layers 110. In another embodiment, the FALU is used in some of the convolutional layers 110. The other convolutional layers 110 may use a different activation function (e.g., ReLU, etc.) or not use any activation functions.

The convolutional layer 110 may receive several images as input and calculates the convolution of each of them with each of the filters. This process can be repeated several times. For instance, the output 160 is passed to the subsequent convolutional layer 110 (i.e., the convolutional layer 110 following the convolutional layer 110 generating the output 160 in the sequence). The subsequent convolutional layers 110 performs a convolution on the output 160 with new filters and generates a new feature map. The new feature map may also be normalized and resized. The new feature map can be filtered again by a further subsequent convolutional layer 110, and so on.

In some embodiments, a convolutional layer 110 has four hyperparameters: the number of filters, the size of filters, the number of steps with which the window corresponding to the filter is dragged on the image (e.g., a step of 1 means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depth-wise separable convolution, transposed convolution, and so on. The ANN 100 includes 16 convolutional layers 110. In other embodiments, the ANN 100 may include a different number of convolutional layers.

The pooling layers 120 downsample feature maps generated by the convolutional layers, e.g., by summarizing the presents of features in the patches of the feature maps. A pooling layer 120 is placed between two convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer 120 is added after a convolutional layer 110 after the activation function has been applied to the feature maps output by the convolutional layer 510.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the ANN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the ANN 100. The fully connected layers 130 may be convolutional or not. The fully connected layers 130 receives an input vector. The input vector defines the output of the convolutional layers 110 and pooling layers 120 and includes the values of the last feature map generated by the last pooling layer 120 in the sequence. The fully connected layers 130 applies an activation function (e.g., the FALU activation function) to the input vector and generates an output vector. The output vector may contain as many elements as there are classes: element i represents the probability that the image belongs to class i. Each element is therefore between 0 and 1, and the sum of all is worth 1. These probabilities are calculated by the last fully connected layer 130 by using a logistic function (binary classification) or a softmax function (multi-class classification) as an activation function.

In some embodiments, the fully connected layers 130 classify the input image 105 and returns a vector of size N, where N is the number of classes in the image classification problem. In the embodiment of FIG. 1, N equals 3, as there are three objects 115, 125, and 135 in the input image. Each element of the vector indicates the probability for the input image 105 to belong to a class. To calculate the probabilities, the fully connected layers 130 multiply each input element by weight, makes the sum, and then applies an activation function (e.g., logistic if N=2, softmax if N>2). This is equivalent to multiplying the input vector by the matrix containing the weights. In an example, the output vector includes three probabilities: a first probability indicating the object 115 being a tree, a second probability indicating the object 125 being a car, and a third probability indicating the object 135 being a person. In other embodiments where the input image 105 includes different objects or a different number of objects, the output vector can be different.

Example DL Environment

FIG. 2 illustrates a DL environment 200, in accordance with various embodiments. The DL environment 200 includes a DL server 210 and a plurality of client devices 220 (individually referred to as client device 220). The DL server 210 is connected to the client devices 220 through a network 240. In other embodiments, the DL environment 200 may include fewer, more, or different components.

The DL server 210 trains DL models using ANNs. An ANN is structured like the human brain and consists of artificial neurons, also known as nodes. These nodes are stacked next to each other in three types of layers: input layer, hidden layer(s), and output layer. Data provides each node with information in the form of inputs. The node multiplies the inputs with random weights, calculates them, and adds a bias. Finally, activation functions are applied to determine which neuron to fire. The DL server 210 can use various types of ANN, such as CNN, recurrent neural network (RNN), generative adversarial network (GAN), long short term memory network (LSTMN), and so on. During the process of training the DL models, the neural networks use unknown elements in the input distribution to extract features, group objects, and discover useful data patterns. The DL models can be used to solve various problems, e.g., making predictions, classifying images, and so on. The DL server 210 may build DL models specific to particular types of problems that need to be solved. A DL model is trained to receive an input and outputs the solution to the particular problem.

In FIG. 2, the DL server 210 includes an ANN system 250, a database 260, and a distributer 270. The ANN system 250 trains ANNs. The ANNs can be used to process images, e.g., images captured by autonomous vehicles, medical devices, satellites, and so on. In an embodiment, an ANN receives an input image and outputs classifications of objects in the input image. An example of the ANNs is the ANN 100 described above in conjunction with FIG. 1.

The database 260 stores data received, used, generated, or otherwise associated with the DL server 210. For example, the database 260 stores a training dataset that the ANN system 250 uses to train ANNs. In an embodiment, the training dataset is an image gallery that can be used to train an ANN for classifying images. The training dataset may include data received from the client devices 220. As another example, the database 260 stores hyperparameters of the neural networks built by the DL server 210.

The distributer 270 distributes DL models generated by the DL server 210 to the client devices 220. In some embodiments, the distributer 270 receives a request for an ANN from a client device 220 through the network 240. The request may include a description of a problem that the client device 220 needs to solve. The request may also include information of the client device 220, such as information describing available computing resource on the client device. The information describing available computing resource on the client device 220 can be information indicating network bandwidth, information indicating available memory size, information indicating processing power of the client device 220, and so on. In an embodiment, the distributer may instruct the ANN system 250 to generate an ANN in accordance with the request. The ANN system 250 may generate an ANN based on the description of the problem.

In another embodiment, the distributer 270 may select the ANN from a group of pre-existing ANNs based on the request. The distributer 270 may select an ANN for a particular client device 230 based on the size of the ANN and available resources of the client device 230. The distributer 270 then transmits the ANN generated or selected for the client device 220 to the client device 220.

In some embodiments, the distributer 270 may receive feedback from the client device 220. For example, the distributer 270 receives new training data from the client device 220 and may send the new training data to the ANN system 250 for further training the ANN. As another example, the feedback includes an update of the available computer resource on the client device 220. The distributer 270 may send a different ANN to the client device 220 based on the update. For instance, after receiving the feedback indicating that the computing resources of the client device 220 have been reduced, the distributer 270 sends an ANN of a smaller size to the client device 220.

The client devices 220 receive ANNs from the distributer 270 and applies the ANNs to solve problems, e.g., to classify objects in images. In various embodiments, the client devices 220 input images into the ANNs and uses the output of the ANNs for various applications, e.g., visual reconstruction, augmented reality, robot localization and navigation, medical diagnosis, weather prediction, and so on. A client device 220 may be one or more computing devices capable of receiving user input as well as transmitting and/or receiving data via the network 240. In one embodiment, a client device 220 is a conventional computer system, such as a desktop or a laptop computer. Alternatively, a client device 220 may be a device having computer functionality, such as a personal digital assistant (PDA), a mobile telephone, a smartphone, an autonomous vehicle, or another suitable device. A client device 220 is configured to communicate via the network 240. In one embodiment, a client device 220 executes an application allowing a user of the client device 220 to interact with the DL server 210 (e.g., the distributer 270 of the DL server 210). The client device 220 may request ANNs or send feedback to the distributer 270 through the application. For example, a client device 220 executes a browser application to enable interaction between the client device 220 and the DL server 210 via the network 240. In another embodiment, a client device 220 interacts with the DL server 210 through an application programming interface (API) running on a native operating system of the client device 220, such as IOS® or ANDROID™.

In an embodiment, a client device 220 is an integrated computing device that operates as a standalone network-enabled device. For example, the client device 220 includes display, speakers, microphone, camera, and input device. In another embodiment, a client device 220 is a computing device for coupling to an external media device such as a television or other external display and/or audio output system. In this embodiment, the client device 220 may couple to the external media device via a wireless interface or wired interface (e.g., an HDMI cable) and may utilize various functions of the external media device such as its display, speakers, microphone, camera, and input devices. Here, the client device 220 may be configured to be compatible with a generic external media device that does not have specialized software, firmware, or hardware specifically for interacting with the client device 220.

The network 240 supports communications between the DL server 210 and client devices 220. The network 240 may comprise any combination of local area and/or wide area networks, using both wired and/or wireless communication systems. In one embodiment, the network 240 may use standard communications technologies and/or protocols. For example, the network 240 may include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 240 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 240 may be represented using any suitable format, such as hypertext markup language (HTML) or extensible markup language (XML). In some embodiments, all or some of the communication links of the network 240 may be encrypted using any suitable technique or techniques.

Example ANN System

Figure 3:
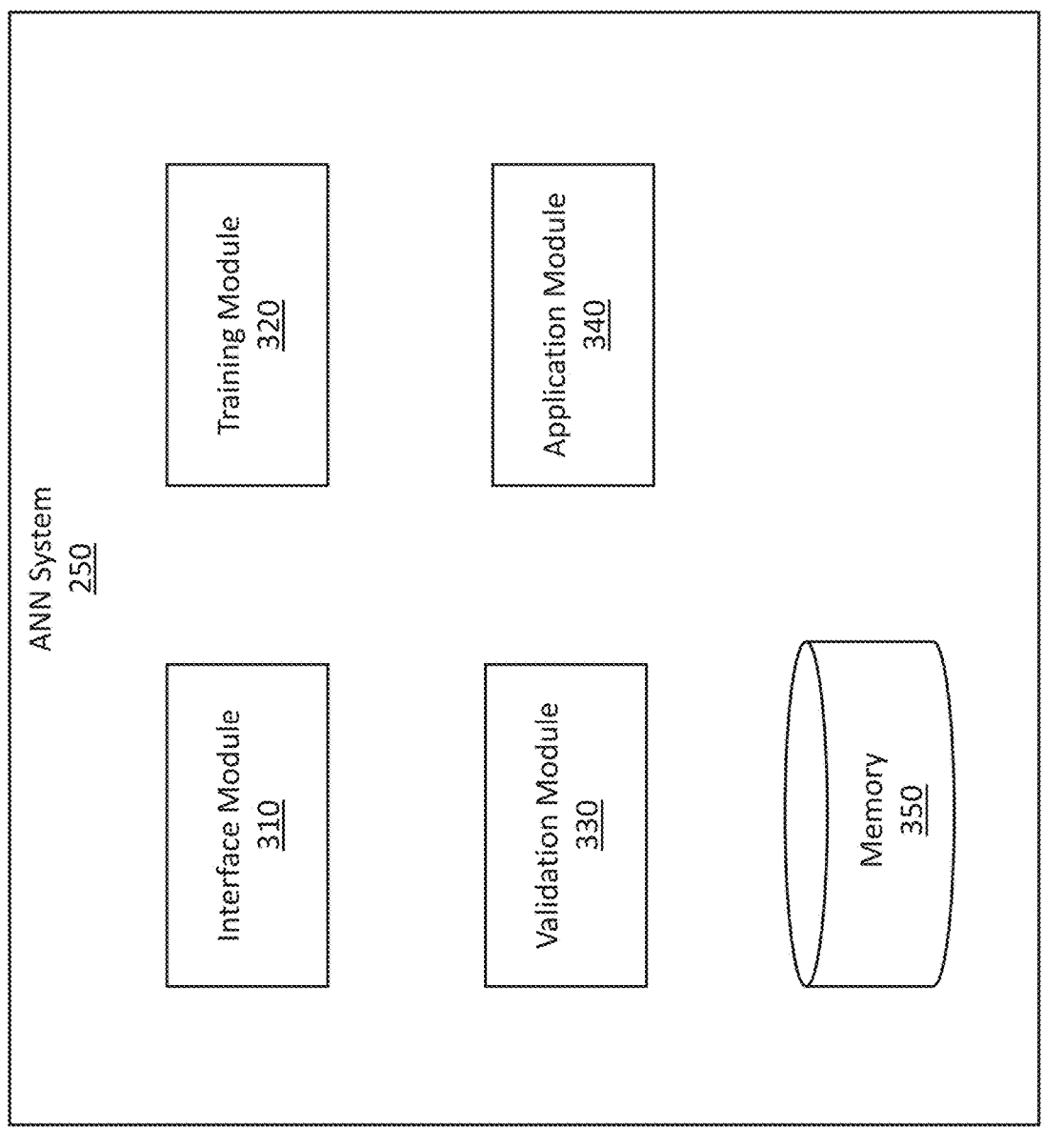
FIG. 3 is a block diagram of an ANN system, in accordance with various embodiments.

FIG. 3 is a block diagram of the ANN system 250, in accordance with various embodiments. The ANN system 250 trains ANNs for various tasks, such as image classification, learning relationships between biological cells (e.g., DNA, proteins, etc.), control behaviors for devices (e.g., robots, machines, etc.), and so on. The ANN system 250 includes an interface module 310, a training module 320, a validation module 330, an application module 340, and a memory 350. In other embodiments, alternative configurations, different or additional components may be included in the ANN system 250. Further, functionality attributed to a component of the ANN system 250 may be accomplished by a different component included in the ANN system 250 or a different system.

The interface module 310 facilitates communications of the ANN system 250 with other systems. For example, the interface module 310 establishes communications between the ANN system 250 with an external database to receive data that can be used to train ANNs or input into ANNs to perform tasks. As another example, the interface module 310 supports the ANN system 250 to distribute ANNs to other systems, e.g., computing devices configured to apply ANNs to perform tasks.

The training module 320 trains ANNs by using a training dataset. The training module 320 forms the training dataset. In an embodiment where the training module 320 trains an ANN to recognize objects in images, the training dataset includes training images and training labels. The training labels describe ground truth classifications of objects in the training images. In some embodiments, each label in the training dataset corresponds to an object in a training image. In some embodiments, a part of the training dataset may be used to initially train the ANN, and the rest of the training dataset may be held back as a validation subset used by the validation module 330 to validate performance of a trained ANN. The portion of the training dataset not including the tuning subset and the validation subset may be used to train the ANN.

The training module 320 also determines hyperparameters for training the ANN. Hyperparameters are variables specifying the ANN training process. Hyperparameters are different from parameters inside the ANN (e.g., weights of filters). In some embodiments, hyperparameters include variables determining the architecture of the ANN, such as number of hidden layers, etc. Hyperparameters also include variables which determine how the ANN is trained, such as batch size, number of epochs, etc. A batch size defines the number of training samples to work through before updating the parameters of the ANN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the DL algorithm works through the entire training dataset. One epoch means that each training sample in the training dataset has had an opportunity to update the parameters inside the ANN. An epoch may include one or more batches. The number of epochs may be 10, 100, 500, 1000, or even larger.

The training module 320 defines the architecture of the ANN, e.g., based on some of the hyperparameters. The architecture of the ANN includes an input layer, an output layer, and a plurality of hidden layers. The input layer of an ANN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the ANN abstract the input image to a feature map that is represented by a tensor specifying the feature map height, the feature map width, and the feature map channels (e.g., red, green, blue images include three channels). A pooling layer is used to reduce the spatial volume of input image after convolution. It is used between two convolution layers. A fully connected layer involves weights, biases, and neurons. It connects neurons in one layer to neurons in another layer. It is used to classify images between different category by training.

In the process of defining the architecture of the ANN, the training module 320 also adds an activation function to a hidden layer or the output layer. An activation function of a layer transforms the weighted sum of the input of the layer to an output of the layer. In various embodiments, the activation function is FALU. In an embodiment, the FALU is defined as:

$$f(x) = D^\alpha x \sigma(\beta x) = \lim_{\delta \to 0} \frac{1}{\delta^\alpha} \sum_{n=0}^{\infty} (-1)^n \frac{\Gamma(\alpha + 1) g(x - \delta n, \beta)}{\Gamma(n + 1)\Gamma(1 - n + \alpha)}$$

In another embodiment, the FALU is defined as:

$$f(x) = D^\alpha x \sigma(\beta x) \approx \begin{cases} g(x, \beta) + \alpha \sigma(\beta x)(1 - g(x, \beta)), & \alpha \in [0, 1] \\ h(x, \beta) + \alpha \sigma(\beta x)(1 - 2h(x, \beta)), & \alpha \in (1, 2] \end{cases}$$

In an embodiment, the training module 320 adds the FALU activation to all the hidden layers and the output layer. In another embodiment, the training module 320 adds the FALU activation to all the hidden layers but adds a different activation to the output layer. In yet another embodiment, the training module 320 adds the FALU activation to some of the hidden layers and add other activation functions to the other hidden layers.

After the training module 320 defines the architecture of the ANN, the training module 320 inputs a training dataset into the ANN. The training dataset includes a plurality of training samples. An example of a training sample includes an object in an image and a ground truth label of the object. The training module 320 modifies the parameters inside the ANN ("internal parameters of the ANN") to minimize the error between labels of the training objects that are generated by the ANN and the ground truth labels of the objects. The internal parameters include weights of filters in the convolutional layers of the ANN and tunable parameters of the FALU activation. In some embodiments, the training module 320 uses a cost function to minimize the error.

The training module 320 may train the ANN for a predetermined number of epochs. The number of epochs is a hyperparameter that defines the number of times that the DL algorithm will work through the entire training dataset. One epoch means that each sample in the training dataset has had an opportunity to update internal parameters of the ANN. After the training module 320 finishes the predetermined number of epochs, the training module 320 may stop updating the parameters in the ANN. The ANN having the updated parameters is referred to as a trained ANN.

The validation module 330 verifies accuracy of trained ANNs. In some embodiments, the validation module 330 inputs samples in a validation dataset into a trained ANN and uses the outputs of the ANN to determine the model accuracy. In some embodiments, a validation dataset may be formed of some or all the samples in the training dataset. Additionally or alternatively, the validation dataset includes additional samples, other than those in the training sets. In some embodiments, the validation module 330 determines may determine an accuracy score measuring the precision, recall, or a combination of precision and recall of the ANN. The validation module 330 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 330 may compare the accuracy score with a threshold score. In an example where the validation module 330 determines that the accuracy score of the augmented model is lower than the threshold score, the validation module 330 instructs the training module 320 to re-train the ANN. In one embodiment, the training module 320 may iteratively re-train the ANN until the occurrence of a stopping condition, such as the accuracy measurement indication that the ANN may be sufficiently accurate, or a number of training rounds having taken place.

The application module 340 applies the trained or validated ANN to perform tasks. For instance, the application module 340 inputs images into the ANN. The ANN outputs classifications of objects in the images. As an example, the ANN may be provisioned in a security setting to detect malicious or hazardous objects in images captured by security cameras. As another example, the ANN may be provisioned to detect objects (e.g., road signs, hazards, humans, pets, etc.) in images captured by cameras of an autonomous vehicle. The input to the ANN may be formatted according to a predefined input structure mirroring the way that the training dataset was provided to the ANN. The ANN may generate an output structure which may be, for example, a classification of the image, a listing of detected objects, a boundary of detected objects, or the like. In some embodiments, the application module 340 distributes the ANN to other systems, e.g., computing devices in communication with the ANN system 250, for the other systems to apply the ANN to perform the tasks.

The memory 350 stores data received, generated, used, or otherwise associated with the ANN system 250. For example, the memory 350 stores the datasets used by the training module 320 and validation module 330. The memory 350 may also store data generated by the training module 320 and validation module 330, such as the hyper-parameters for training ANNs, internal parameters of trained ANNs (e.g., values of tunable parameters of FALUs), etc. In the embodiment of FIG. 1, the memory 350 is a component of the ANN system 250. In other embodiments, the memory 350 may be external to the ANN system 250 and communicate with the ANN system 250 through a network.

Example FALU Activation Functions

Figure 4:
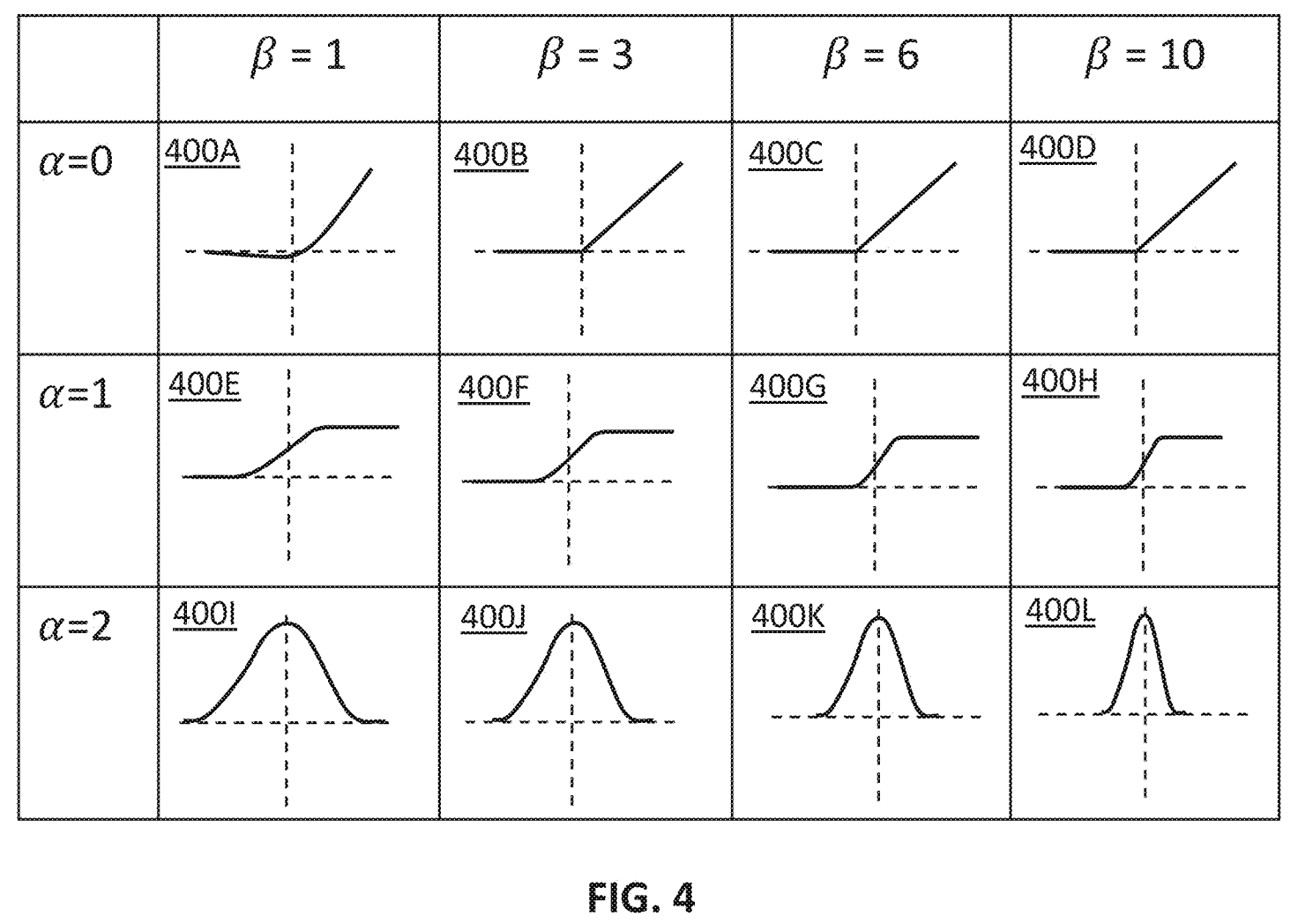

FIG. 4 illustrates example FALU activation functions 410A-L, in accordance with various embodiments. The FALU activation is defined as:

$$f(x)=D^c x\sigma(\beta x)$$

In the embodiment of FIG. 4, the fractional derivative order is confined to the domain of [0,2] and the scaling parameter is confined to the domain of [1, 10]. FIG. 4 shows nine activation functions 400A-L (collectively referred to as "activation functions 400" or "activation function 400") that FALU can generate. Each activation function 400 is generated by using a different value of the fractional derivative order $\alpha$ or scaling parameter $\beta$.

As shown in FIG. 4, the activation functions 410A-D are generated based on $\alpha=0$. Thus, the activation functions 410A-D are defined as:

$$f(x)=x\sigma(\beta x)$$

For the activation function 410A, $\beta=1$. Thus, the activation function 410A is the Swish activation function. For the activation function 410B, $\beta=3$. For the activation function 410C, $\beta=6$. For the activation function 410D, $\beta=10$. The activation functions 410B-D are similar to the Swish activation function.

The activation functions 410E-H are generated based on $\alpha=1$. Thus, the activation functions 410E-H are defined as:

$$f(x)=D^1 x\sigma(\beta x)$$

For the activation function 410E, $\beta=1$, so the activation function 410E is the Swish activation. For the activation function 410F, $\beta=3$. For the activation function 410g, $\beta=6$. For the activation function 410H, $\beta=10$.

The activation functions 410I-L are generated based on $\alpha=2$. Thus, the activation functions 410I-L are defined as:

$$f(x)=\beta^2 x\sigma(\beta x)$$

410I-L For the activation function 410I, $\beta=1$. For the activation function 410J, $\beta=3$. For the activation function 410K, $\beta=6$. For the activation function 410L, $\beta=10$. As shown in FIG. 4, the activation functions 410I-L are similar to Gaussian curves.

Even though FIG. 4 shows nine activation functions 410, the FALU activation can be used to generate other activation functions by using different values for the fractional derivative order $\alpha$ or scaling parameter $\beta$. Thus, the FALU activation represents a family of activation functions including the known activation functions and fine-tuned implementations between the known activation functions.

Figure 5:
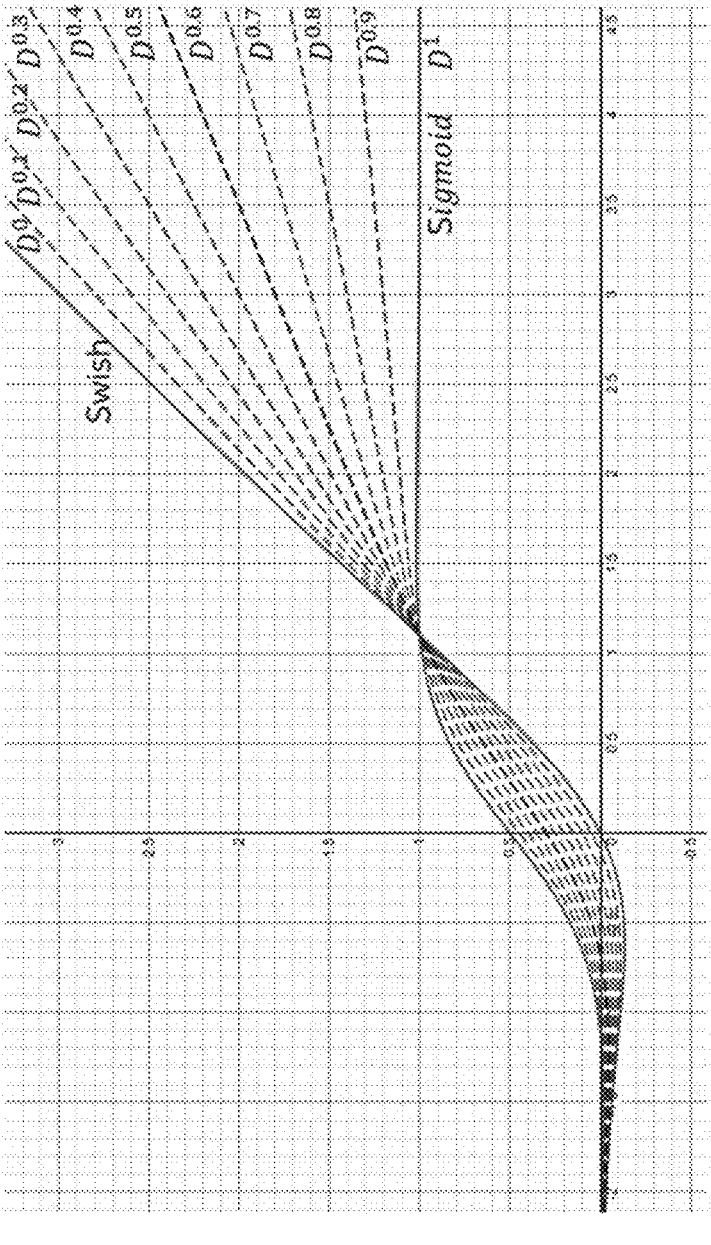
FIG. 5 illustrates a family of FALU activation functions generated by changes in the fractional derivative order in a domain from 0 to 1, in accordance with various embodiments.

FIG. 5 illustrates a family of FALU activation functions generated by changes in the fractional derivative order in a domain from 0 to 1, in accordance with various embodiments. In the embodiments of FIG. 5, the domain of a is restricted to [0,1]. FIG. 5 shows 11 curves that represent 11 activation functions generated based on 11 different values of $\alpha$ in the domain of [0,1]: 0, 0.1, 0.2, 0.3, 0.4, 0.5, 0.6, 0.7, 0.8, 0.9, and 1. The value of $\beta$ is in the vicinity of 1. The curve for $\alpha=0$ represents the Swish function. The curve for $\alpha=1$ represents the Sigmoid function. The other curves represent find-tuned implementation between the Swish function and the Sigmoid function.

Figure 6:
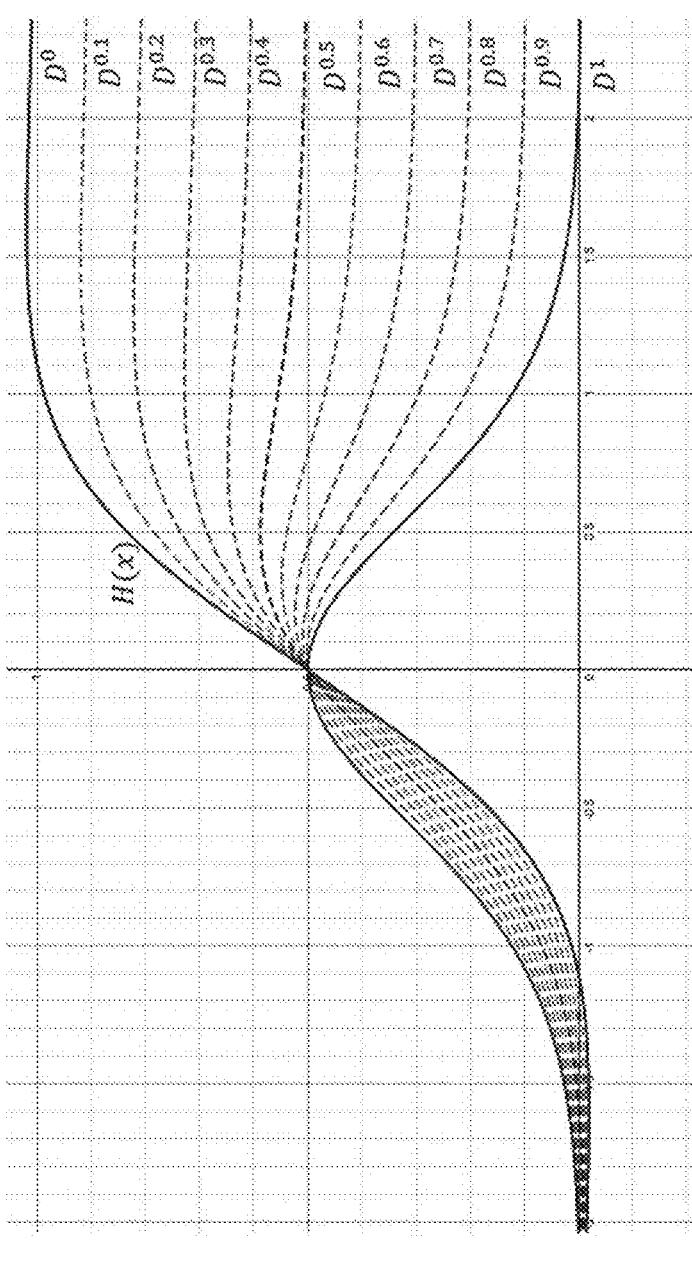
FIG. 6 illustrates a family of FALU activation functions generated by changes in the fractional derivative order in a domain from 1 to 2, in accordance with various embodiments.

FIG. 6 illustrates a family of FALU activation functions generated by changes in the fractional derivative order in a domain from 1 to 2, in accordance with various embodiments. FIG. 6 shows h(x) curves generated by changes in the fractional derivative order in a domain from 0 to 1, which is equivalent to changes in the fractional derivative order in a domain from 1 to 2 for g(x). FIG. 6 shows 11 curves that represent 11 activation functions generated based on 11 different values of $\alpha$ for h(x) in the domain of [0,1]: 0, 0.1, 0.2, 0.3, 0.4, 0.5, 0.6, 0.7, 0.8, 0.9, and 1. The 11 values are equivalent to 1, 1.1, 1.2, 1.3, 1.4, 1.5, 1.6, 1.7, 1.8, 1.9, and 2 for g(x). The value of $\beta$ is in the vicinity of 1. The h(x) curve for $\alpha=0$ (i.e., $\alpha=1$ for g(x)) represents the Sigmoid function. The h(x) curve for $\alpha=1$ (i.e., $\alpha=2$ for g(x))) represents the Gaussian function. The other curves represent find-tuned implementation between the Sigmoid function and the Gaussian function.

Example Method of DL

FIG. 7 is a flowchart showing a method 700 of DL based on a trainable activation function, in accordance with various embodiments. The method 700 may be performed by the ANN system 250 described above in conjunction with FIGS. 2 and 3. Although the method 700 is described with reference to the flowchart illustrated in FIG. 7, many other methods of DL based on trainable activation functions may alternatively be used. For example, the order of execution of the steps in FIG. 7 may be changed. As another example, some of the steps may be changed, eliminated, or combined.

The ANN system 250 accesses 710 a neural network. The neural network includes an input layer, a plurality of hidden layers, and an output layer. The hidden layers include, for example, convolutional layers, pooling layers, and fully connected layers. An example of the neural network is the ANN 100 in FIG. 1.

The ANN system 250 adds 720 the trainable activation function to one or more hidden layers of the plurality of hidden layers. In some embodiments, the ANN system 250 adds the trainable activation function to all the hidden layers. In other embodiments, the ANN system 250 adds the trainable activation function to some of the hidden layers and adds other trainable activation functions to the other hidden layers. The ANN system 250 may also add the trainable activation function to the output layer. An example of the trainable activation function is FALU. The trainable activation function includes a tunable parameter, the value of which can be determined through training. The tunable parameter represents a fractional derivative order. In some embodiments, the tunable parameter is a real number fractional derivative order. The ANN system 250 confines the domain of the tunable parameter to the range from 0 to 2. The trainable activation function may also include an additional tunable parameter, such as a scaling parameter. The value of the scaling parameter can be determined through training. The ANN system 250 may confine the domain of the tunable parameter to the range from 1 to 10.

The ANN system 250 trains the neural network by inputting training samples into the neural network. The ANN system 250 can treat the tunable parameter as an internal parameter of the ANN during the training process. During the training process, the ANN system determines a value of the tunable parameter in the trainable activation function based on the training samples. For instance, the ANN system determines a value of the tunable parameter in each layer that includes the trainable activation function. For the trainable activation function in different layers, the value of the tunable parameter can be different. In embodiments where the ANN system 250 confines the domain of the tunable parameter, the determined value of the tunable parameter is in the domain. In embodiments where the trainable activation function includes the tunable scaling parameter, the ANN system 250 also determines the value of the scaling parameter in each layer including the trainable activation function during the training process. The value of the scaling parameter can be different in different layers. The value(s) of the scaling parameter may be in a range from 1 to 10, which is a domain confined by the ANN system 250. The trained ANN can be used to solve a problem, e.g., classifying images, etc.

In some embodiments, the value of the tunable parameter or the additional tunable parameter can be adjusted by re-training the ANN. For instance, new training samples can be input the ANN to adjust the value of the tunable parameter or the additional tunable parameter.

Example Computing Device

Figure 8:
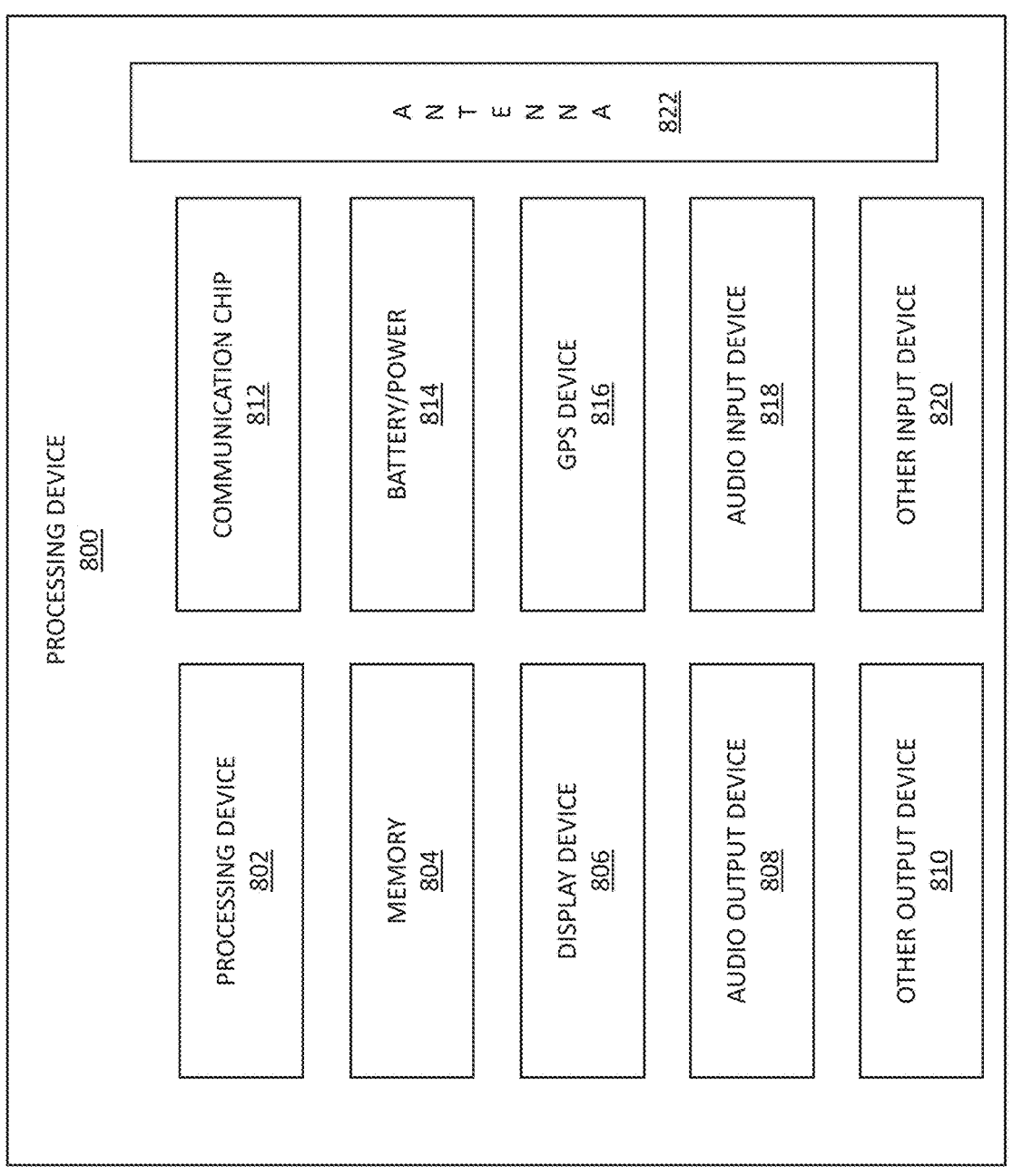
FIG. 8 is a block diagram of an example computing system for use as the ANN system 250, in accordance with various embodiments.

FIG. 8 is a block diagram of an example computing system for use as the ANN system 250, in accordance with various embodiments. A number of components are illustrated in FIG. 8 as included in the computing system 800, but any one or more of these components may be omitted or duplicated, as suitable for the application. In some embodiments, some or all of the components included in the computing system 800 may be attached to one or more motherboards. In some embodiments, some or all of these components are fabricated onto a single system on a chip (SoC) die. Additionally, in various embodiments, the computing system 800 may not include one or more of the components illustrated in FIG. 8, but the computing system 800 may include interface circuitry for coupling to the one or more components. For example, the computing system 800 may not include a display device 806, but may include display device interface circuitry (e.g., a connector and driver circuitry) to which a display device 806 may be coupled. In another set of examples, the computing system 800 may not include an audio input device 818 or an audio output device 808, but may include audio input or output device interface circuitry (e.g., connectors and supporting circuitry) to which an audio input device 818 or audio output device 808 may be coupled.

The computing system 800 may include a processing device 802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device

802 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing system 800 may include a memory 804, which may itself include one or more memory devices such as volatile memory (e.g., DRAM), nonvolatile memory (e.g., read-only memory (ROM)), flash memory, solid state memory, and/or a hard drive. In some embodiments, the memory 804 may include memory that shares a die with the processing device 802. In some embodiments, the memory 804 includes one or more non-transitory computer-readable media storing instructions executable to perform operations for DL, e.g., the method 700 described above in conjunction with FIG. 7 or the operations performed by the ANN system 250 described above in conjunction with FIGS. 2 and 3. The instructions stored in the one or more non-transitory computer-readable media may be executed by the processing device 802.

In some embodiments, the computing system 800 may include a communication chip 812 (e.g., one or more communication chips). For example, the communication chip 812 may be configured for managing wireless communications for the transfer of data to and from the computing system 800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 812 may implement any of a number of wireless standards or protocols, including but not limited to Institute for Electrical and Electronic Engineers (IEEE) standards including Wi-Fi (IEEE 802.8 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 812 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 812 may operate in accordance with other wireless protocols in other embodiments. The computing system 800 may include an antenna 822 to facilitate wireless communications and/or to receive other wireless communications (such as AM or FM radio transmissions).

In some embodiments, the communication chip 812 may manage wired communications, such as electrical, optical, or any other suitable communication protocols (e.g., the Ethernet). As noted above, the communication chip 812 may include multiple communication chips. For instance, a first communication chip 812 may be dedicated to shorter-range wireless communications such as Wi-Fi or Bluetooth, and a second communication chip 812 may be dedicated to longer-range wireless communications such as global positioning system (GPS), EDGE, GPRS, CDMA, WiMAX, LTE, EV-DO, or others. In some embodiments, a first communication chip 812 may be dedicated to wireless communications, and a second communication chip 812 may be dedicated to wired communications.

The computing system 800 may include battery/power circuitry 814. The battery/power circuitry 814 may include one or more energy storage devices (e.g., batteries or capacitors) and/or circuitry for coupling components of the computing system 800 to an energy source separate from the computing system 800 (e.g., AC line power).

The computing system 800 may include a display device 806 (or corresponding interface circuitry, as discussed above). The display device 806 may include any visual indicators, such as a heads-up display, a computer monitor, a projector, a touchscreen display, a liquid crystal display (LCD), a light-emitting diode display, or a flat panel display, for example.

The computing system 800 may include an audio output device 808 (or corresponding interface circuitry, as discussed above). The audio output device 808 may include any device that generates an audible indicator, such as speakers, headsets, or earbuds, for example.

The computing system 800 may include an audio input device 818 (or corresponding interface circuitry, as discussed above). The audio input device 818 may include any device that generates a signal representative of a sound, such as microphones, microphone arrays, or digital instruments (e.g., instruments having a musical instrument digital interface (MIDI) output).

The computing system 800 may include a GPS device 816 (or corresponding interface circuitry, as discussed above). The GPS device 816 may be in communication with a satellite-based system and may receive a location of the computing system 800, as known in the art.

The computing system 800 may include an other output device 88 (or corresponding interface circuitry, as discussed above). Examples of the other output device 88 may include an audio codec, a video codec, a printer, a wired or wireless transmitter for providing information to other devices, or an additional storage device.

The computing system 800 may include another input device 820 (or corresponding interface circuitry, as discussed above). Examples of the other input device 820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing system 800 may have any desired form factor, such as a handheld or mobile computing system (e.g., a cell phone, a smart phone, a mobile internet device, a music player, a tablet computer, a laptop computer, a netbook computer, an ultrabook computer, a PDA, an ultramobile personal computer, etc.), a desktop computing system, a server or other networked computing component, a printer, a scanner, a monitor, a set-top box, an entertainment control unit, a vehicle control unit, a digital camera, a digital video recorder, or a wearable computing system. In some embodiments, the computing system 800 may be any other electronic device that processes data.

SELECT EXAMPLES

The following paragraphs provide various examples of the embodiments disclosed herein.

Example 1 provides a method for deep learning based on a trainable activation function, the method including accessing a neural network including an input layer, a plurality of hidden layers, and an output layer; adding a trainable activation function to one or more hidden layers of the plurality of hidden layers, the trainable activation function including a tunable parameter, the tunable parameter representing a fractional derivative order; and training the neural network by inputting a plurality of training samples into the neural network, where training the neural network includes determining a value of the tunable parameter based on the plurality of training samples.

Example 2 provides the method of example 1, where determining the value of the tunable parameter based on the plurality of training samples includes confining a domain of the tunable parameter to a range from 0 to 2; and determining the value of the tunable parameter within the domain based on the plurality of training samples.

Example 3 provides the method of example 1, where adding the trainable activation function to the one or more hidden layers of the plurality of hidden layers includes adding the trainable activation function to a first hidden layer and a second hidden layer, where training the neural network includes determining a first value of the tunable parameter for the first hidden layer based on the plurality of training samples, and determining a second value of the tunable parameter for the second hidden layer based on the plurality of training samples.

Example 4 provides the method of example 3, where the first value of the tunable parameter is different from second value of the tunable parameter.

Example 5 provides the method of example 1, where the trainable activation function includes an additional tunable parameter, and training the neural network further includes determining a value of the additional tunable parameter based on the plurality of training samples.

Example 6 provides the method of example 3, determining the value of the additional tunable parameter includes confining a domain of the additional tunable parameter to a range from 1 to 10; and determining the value of the additional tunable parameter within the domain of the additional tunable parameter.

Example 7 provides the method of example 3, where adding the trainable activation function to the one or more hidden layers of the plurality of hidden layers includes adding the trainable activation function to a first hidden layer and a second hidden layer, where training the neural network includes determining a first value of the tunable parameter and a second value of the additional tunable parameter for the first hidden layer based on the plurality of training samples, and determining a third value of the tunable parameter and a fourth value of the additional tunable parameter for the second hidden layer based on the plurality of training samples.

Example 8 provides one or more non-transitory computer-readable media storing instructions executable to perform operations for deep learning based on a trainable activation function, the operations including accessing a neural network including an input layer, a plurality of hidden layers, and an output layer; adding the trainable activation function to one or more hidden layers of the plurality of hidden layers, the trainable activation function including a tunable parameter, the tunable parameter representing a fractional derivative order; and training the neural network by inputting a plurality of training samples into the neural network, where training the neural network includes determining a value of the tunable parameter based on the plurality of training samples.

Example 9 provides the one or more non-transitory computer-readable media of example 8, where determining the value of the tunable parameter based on the plurality of training samples includes confining a domain of the tunable parameter to a range from 0 to 2; and determining the value of the tunable parameter within the domain based on the plurality of training samples.

Example 10 provides the one or more non-transitory computer-readable media of example 8, where adding the trainable activation function to the one or more hidden layers of the plurality of hidden layers includes adding the trainable activation function to a first hidden layer and a second hidden layer, where training the neural network includes determining a first value of the tunable parameter for the first hidden layer based on the plurality of training samples, and determining a second value of the tunable parameter for the second hidden layer based on the plurality of training samples.

Example 11 provides the one or more non-transitory computer-readable media of example 10, where the first value of the tunable parameter is different from second value of the tunable parameter.

Example 12 provides the one or more non-transitory computer-readable media of example 8, where the trainable activation function includes an additional tunable parameter, and training the neural network further includes determining a value of the additional tunable parameter based on the plurality of training samples.

Example 13 provides the one or more non-transitory computer-readable media of example 12, where determining the value of the additional tunable parameter includes confining a domain of the additional tunable parameter to a range from 1 to 10; and determining the value of the additional tunable parameter within the domain of the additional tunable parameter.

Example 14 provides the one or more non-transitory computer-readable media of example 12, where adding the trainable activation function to the one or more hidden layers of the plurality of hidden layers includes adding the trainable activation function to a first hidden layer and a second hidden layer, where training the neural network includes determining a first value of the tunable parameter and a second value of the additional tunable parameter for the first hidden layer based on the plurality of training samples, and determining a third value of the tunable parameter and a fourth value of the additional tunable parameter for the second hidden layer based on the plurality of training samples.

Example 15 provides an apparatus for deep learning based on a trainable activation function, the apparatus including a computer processor for executing computer program instructions; and a non-transitory computer-readable memory storing computer program instructions executable by the computer processor to perform operations including accessing a neural network including an input layer, a plurality of hidden layers, and an output layer, adding the trainable activation function to one or more hidden layers of the plurality of hidden layers, the trainable activation function including a tunable parameter, the tunable parameter representing a fractional derivative order, and training the neural network by inputting a plurality of training samples into the neural network, where training the neural network includes determining a value of the tunable parameter based on the plurality of training samples.

Example 16 provides the apparatus of example 15, where the operations further include confining a domain of the tunable parameter to a range from 0 to 2, where determining the value of the tunable parameter based on the plurality of training samples includes confining a domain of the tunable parameter to a range from 0 to 2; and determining the value of the tunable parameter within the domain based on the plurality of training samples.

Example 17 provides the apparatus of example 15, where adding the trainable activation function to the one or more hidden layers of the plurality of hidden layers includes adding the trainable activation function to a first hidden layer and a second hidden layer, where training the neural network includes determining a first value of the tunable parameter for the first hidden layer based on the plurality of training samples, and determining a second value of the tunable parameter for the second hidden layer based on the plurality of training samples.

Example 18 provides the apparatus of example 17, where the first value of the tunable parameter is different from second value of the tunable parameter.

Example 19 provides the apparatus of example 15, where the trainable activation function includes an additional tunable parameter, and training the neural network further includes determining a value of the additional tunable parameter based on the plurality of training samples.

Example 20 provides the apparatus of example 19, where determining the value of the additional tunable parameter includes confining a domain of the additional tunable parameter to a range from 1 to 10; and determining the value of the additional tunable parameter within the domain of the additional tunable parameter.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A method for deep learning based on a trainable activation function, the method comprising:

accessing a neural network comprising an input layer, a plurality of hidden layers, and an output layer;

adding the trainable activation function with a differentiation operator to one or more hidden layers of the plurality of hidden layers, the trainable activation function comprising a tunable parameter, the tunable parameter representing a fractional derivative order of the differentiation operator in the trainable activation function; and training the neural network by inputting a plurality of training samples into the neural network, wherein training the neural network comprises:

determining a value of the tunable parameter based on the plurality of training samples.

2. The method of claim 1, wherein determining the value of the tunable parameter based on the plurality of training samples comprises:

confining a domain of the tunable parameter to a range from 0 to 2; and determining the value of the tunable parameter within the domain based on the plurality of training samples.

3. The method of claim 1, wherein adding the trainable activation function with the differentiation operator to the one or more hidden layers of the plurality of hidden layers comprises:

adding the trainable activation function with the differentiation operator to a first hidden layer and a second hidden layer, wherein training the neural network comprises:

determining a first value of the tunable parameter for the first hidden layer based on the plurality of training samples, and determining a second value of the tunable parameter for the second hidden layer based on the plurality of training samples.

4. The method of claim 3, wherein the first value of the tunable parameter is different from second value of the tunable parameter.

5. The method of claim 1, wherein the trainable activation function comprises a tunable scaling parameter that scales an input of the trainable activation function, and training the neural network further comprises:

determining a value of the tunable scaling parameter based on the plurality of training samples.

6. The method of claim 5, wherein determining the value of the tunable scaling parameter comprises:

confining a domain of the tunable scaling parameter to a range from 1 to 10; and determining the value of the tunable scaling parameter within the domain of the tunable scaling parameter.

7. The method of claim 5, wherein adding the trainable activation function with the differentiation operator to the one or more hidden layers of the plurality of hidden layers comprises:

adding the trainable activation function with the differentiation operator to a first hidden layer and a second hidden layer, wherein training the neural network comprises:

determining a first value of the tunable parameter and a second value of the tunable scaling parameter for the first hidden layer based on the plurality of training samples, and determining a third value of the tunable parameter and a fourth value of the tunable scaling parameter for the second hidden layer based on the plurality of training samples.

8. One or more non-transitory computer-readable media storing instructions executable to perform operations for deep learning based on a trainable activation function, the operations comprising:

accessing a neural network comprising an input layer, a plurality of hidden layers, and an output layer;

adding the trainable activation function with a differentiation operator to one or more hidden layers of the plurality of hidden layers, the trainable activation function comprising a tunable parameter, the tunable parameter representing a fractional derivative order of the differentiation operator in the trainable activation function; and training the neural network by inputting a plurality of training samples into the neural network, wherein training the neural network comprises:

determining a value of the tunable parameter based on the plurality of training samples.

9. The one or more non-transitory computer-readable media of claim 8, wherein determining the value of the tunable parameter based on the plurality of training samples comprises:

confining a domain of the tunable parameter to a range from 0 to 2; and determining the value of the tunable parameter within the domain based on the plurality of training samples.

10. The one or more non-transitory computer-readable media of claim 8, wherein adding the trainable activation function with the differentiation operator to the one or more hidden layers of the plurality of hidden layers comprises:

adding the trainable activation function with the differentiation operator to a first hidden layer and a second hidden layer, wherein training the neural network comprises:

determining a first value of the tunable parameter for the first hidden layer based on the plurality of training samples, and determining a second value of the tunable parameter for the second hidden layer based on the plurality of training samples.

11. The one or more non-transitory computer-readable media of claim 10, wherein the first value of the tunable parameter is different from second value of the tunable parameter.

12. The one or more non-transitory computer-readable media of claim 8, wherein the trainable activation function comprises a tunable scaling parameter that scales an input of the trainable activation function, and training the neural network further comprises:

determining a value of the tunable scaling parameter based on the plurality of training samples.

13. The one or more non-transitory computer-readable media of claim 12, wherein determining the value of the tunable scaling parameter comprises:

confining a domain of the tunable scaling parameter to a range from 1 to 10; and determining the value of the tunable scaling parameter within the domain of the tunable scaling parameter.

14. The one or more non-transitory computer-readable media of claim 12, wherein adding the trainable activation function with the differentiation operator to the one or more hidden layers of the plurality of hidden layers comprises:

adding the trainable activation function with the differentiation operator to a first hidden layer and a second hidden layer, wherein training the neural network comprises:

determining a first value of the tunable parameter and a second value of the tunable scaling parameter for the first hidden layer based on the plurality of training samples, and determining a third value of the tunable parameter and a fourth value of the tunable scaling parameter for the second hidden layer based on the plurality of training samples.

15. An apparatus for deep learning based on a trainable activation function, the apparatus comprising:

a computer processor for executing computer program instructions; and a non-transitory computer-readable memory storing computer program instructions executable by the computer processor to perform operations comprising:

accessing a neural network comprising an input layer, a plurality of hidden layers, and an output layer, adding the trainable activation function with a differentiation operator to one or more hidden layers of the plurality of hidden layers, the trainable activation function comprising a tunable parameter, the tunable parameter representing a fractional derivative order of the differentiation operator in the trainable activation function, and training the neural network by inputting a plurality of training samples into the neural network, wherein training the neural network comprises:

determining a value of the tunable parameter based on the plurality of training samples.

16. The apparatus of claim 15, wherein determining the value of the tunable parameter based on the plurality of training samples comprises:

confining a domain of the tunable parameter to a range from 0 to 2; and determining the value of the tunable parameter within the domain based on the plurality of training samples.

17. The apparatus of claim 15, wherein adding the trainable activation function with the differentiation operator to the one or more hidden layers of the plurality of hidden layers comprises:

adding the trainable activation function with the differentiation operator to a first hidden layer and a second hidden layer, wherein training the neural network comprises:

determining a first value of the tunable parameter for the first hidden layer based on the plurality of training samples, and determining a second value of the tunable parameter for the second hidden layer based on the plurality of training samples.

18. The apparatus of claim 17, wherein the first value of the tunable parameter is different from second value of the tunable parameter.

19. The apparatus of claim 15, wherein the trainable activation function comprises a tunable scaling parameter that scales an input of the trainable activation function, and training the neural network further comprises:

determining a value of the tunable scaling parameter based on the plurality of training samples.

20. The apparatus of claim 19, wherein determining the value of the tunable scaling parameter comprises:

confining a domain of the tunable scaling parameter to a range from 1 to 10; and determining the value of the tunable scaling parameter within the domain of the tunable scaling parameter.

* * * * *